US 11,637,927 B2

(12) United States Patent
Drory et al.

(10) Patent No.: US 11,637,927 B2
(45) Date of Patent: Apr. 25, 2023

(54) AUTOMATED CHATBOT GENERATION FROM AN INTERACTIVE VOICE RESPONSE TREE

(71) Applicant: International Business Machines Corporation, Armonk, NY (US)

(72) Inventors: Tal Drory, Haifa (IL); Aya Soffer, Haifa (IL); Ron Hoory, Ramat Yishay (IL); Aharon Satt, Kiryat Tivon (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/376,193

(22) Filed: Jul. 15, 2021

(65) Prior Publication Data

US 2023/0020613 A1    Jan. 19, 2023

(51) Int. Cl.
*H04M 3/493*    (2006.01)
*G10L 15/22*    (2006.01)
*H04L 51/02*    (2022.01)

(52) U.S. Cl.
CPC ........... *H04M 3/4936* (2013.01); *G10L 15/22* (2013.01); *H04L 51/02* (2013.01)

(58) Field of Classification Search
CPC ..... H04M 3/4936; H04M 3/493; G10L 15/22; H04L 51/02; H04L 65/1069; G06F 40/30
See application file for complete search history.

(56) References Cited

U.S. PATENT DOCUMENTS

| | | | |
|---|---|---|---|
| 6,920,425 B1 | 7/2005 | Will | |
| 8,000,454 B1* | 8/2011 | Or-Bach | H04M 1/2477 379/100.14 |
| 8,224,649 B2 | 7/2012 | Chaudhari et al. | |
| 9,742,912 B2* | 8/2017 | Srivastava | H04M 3/4936 |
| 9,948,778 B2* | 4/2018 | de Silva | H04L 51/02 |
| 11,303,749 B1* | 4/2022 | Baror | H04M 3/4936 |
| 2008/0095330 A1* | 4/2008 | Jin | H04M 7/0048 379/88.13 |

(Continued)

OTHER PUBLICATIONS

Conversational IVR for Intuitive Customer Self-Service; Online at: https://www.genesys.com/blog/post/conversational-ivr-for-intuitive-customer-self-service. May 20, 2019.

(Continued)

*Primary Examiner* — Akelaw Teshale
(74) *Attorney, Agent, or Firm* — Dvir Gassner

(57) ABSTRACT

A method comprising: receiving an interactive voice response (IVR) tree configured to implement one or more tasks, each associated with one or more IVR node paths comprising a plurality of IVR nodes arranged in a hierarchical relationship; analyzing the IVR tree to identify one or more intent IVR nodes, each associated with one of the tasks; with respect to each of the intent IVR nodes, identifying a plurality of corresponding entity IVR nodes included within the IVR node path associated with the intent IVR node; assembling one or more task-specific chatbot skills, each comprising (i) one of the intent IVR nodes, and (ii) at least some of the plurality of corresponding entity IVR nodes, wherein each of the task-specific chatbot skills is configured to perform one of the tasks by conducting a dialog with a user; and generating a chatbot comprising at least one of the task-specific chatbot skills.

17 Claims, 11 Drawing Sheets

(56) References Cited

U.S. PATENT DOCUMENTS

| | | | |
|---|---|---|---|
| 2014/0122053 A1* | 5/2014 | Lotan | G16H 10/60 704/270.1 |
| 2015/0172463 A1* | 6/2015 | Quast | H04M 3/4936 379/88.01 |
| 2015/0215455 A1* | 7/2015 | Perotti | H04M 3/493 379/88.01 |
| 2016/0300570 A1 | 10/2016 | Gustafson et al. | |
| 2016/0352658 A1 | 12/2016 | Capper | |
| 2016/0360037 A1* | 12/2016 | van Rensburg | H04M 3/493 |
| 2017/0324866 A1* | 11/2017 | Segre | H04M 3/5191 |
| 2017/0374198 A1* | 12/2017 | de Silva | H04M 3/5191 |
| 2018/0048594 A1* | 2/2018 | de Silva | H04L 51/56 |
| 2018/0084111 A1* | 3/2018 | Pirat | H04L 51/04 |
| 2022/0103684 A1* | 3/2022 | Chavez | H04M 3/493 |

OTHER PUBLICATIONS

Digital Customer Service: How Chatbots will transform Traditional IVR; Online at: https://blog.kore.ai/digital-customer-service-how-chatbots-will-transform-traditional-ivr. unknown publication date.

How I made my ChatBot smarter by helping it understand intent; Online at: https://www.freecodecamp.org/news/how-i-made-a-smarter-chatbot-with-intents-5e6ad6e0fd71/. Jun. 18, 2018.

The modern approach to IVR customer self service; Online at: https://www.nuance.com/omni-channel-customer-engagement/voice-and-ivr/conversational-ivr.html. unknown publication date.

What is Conversational IVR and Why Businesses Should Care; Online at: https://getvoip.com/blog/2019/05/01/what-is-conversational-ivr/. May 8, 2020.

\* cited by examiner

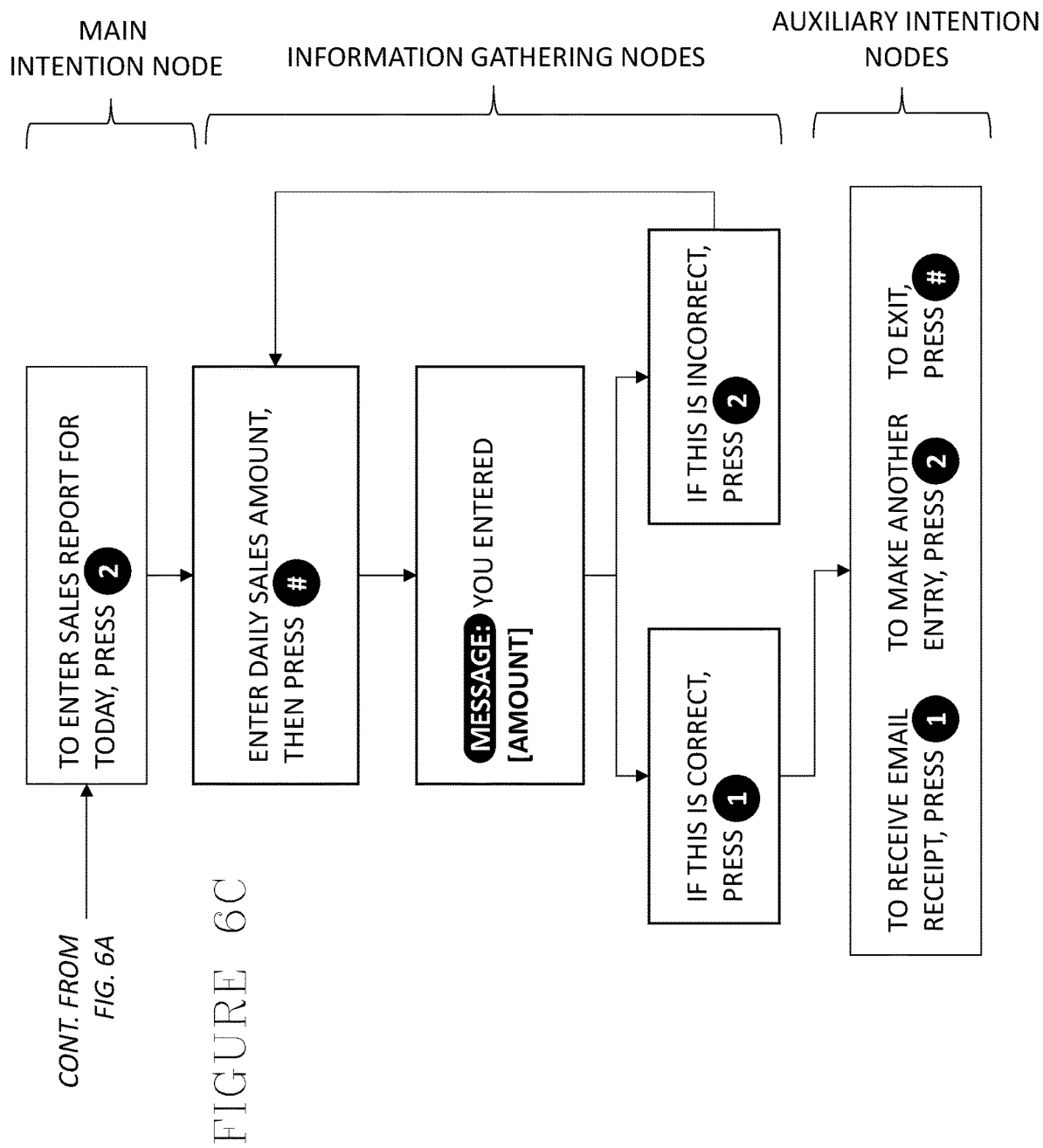

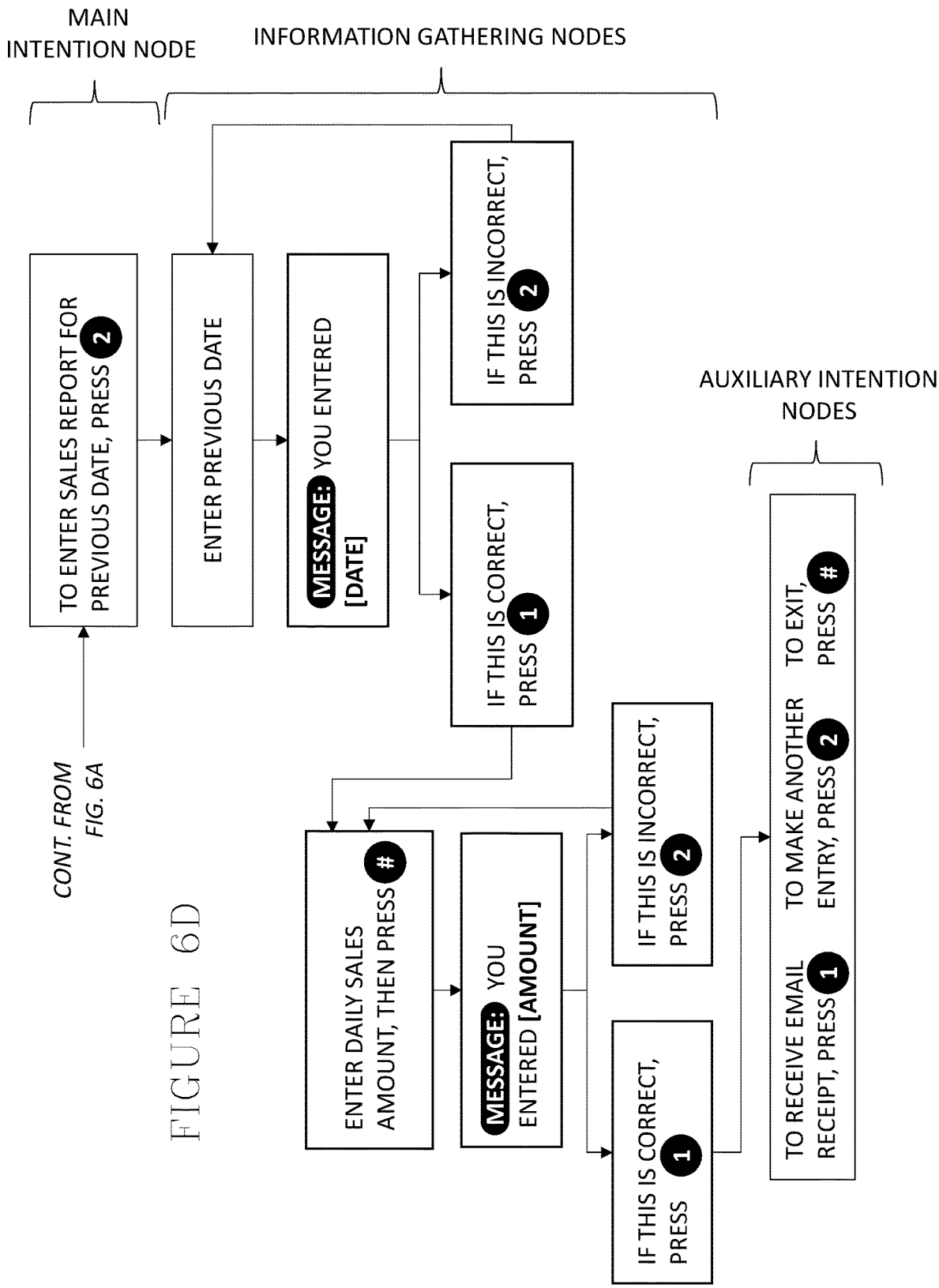

AUTOMATED CHATBOT GENERATION FROM AN INTERACTIVE VOICE RESPONSE TREE

FIELD OF THE INVENTION

The invention relates to the field of systems and methods that automate user interactions.

BACKGROUND

Large organizations that offer products and services to customers, typically rely on call centers and interactive voice response (IVR) systems to interact with their customers for account servicing.

IVR systems provide customers with requested information and perform routine account actions without having to maintain a large workforce of human customer service agents. Although cost effective, existing computerized customer interaction systems tend to provide an impersonal and robotic user experience, limited by scripted questions and responses, and can require a cumbersome authorization process for each customer-service session.

IVR systems are based on a tree structure interaction, where users provide inputs via touch tones or spoken keywords. This type of human-machine interaction typically requires multiple question-answering turns to capture user servicing intent, obtain the necessary user inputs, and then implement the required action. Therefore, this type of interaction is considered tedious, time-consuming and not user-friendly.

As an alternative to voice-based communication systems, some enterprises provide automated systems for these interactions, such as computer programs (generally, 'chatbots') configured to conduct conversations with humans over text chat or voice in order to provide information and/or to perform certain services. Chatbots offer several advantages over traditional IVR systems, such as allowing users to express their servicing intention using natural language, either in text or speech. However, transforming an IVR tree into a chatbot 'skill' remains a challenging task.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instructions, the program instructions executable by the at least one hardware processor to: receive, as input, an interactive voice response (IVR) tree, wherein the IVR tree is configured to implement one or more tasks, and wherein each of the one or more tasks is associated with one or more IVR node paths, each comprising a plurality of IVR nodes arranged in a hierarchical relationship within the IVR tree, analyze the IVR tree to identify one or more intent IVR nodes, each associated with one of the tasks, with respect to each of the intent IVR nodes, identify a plurality of corresponding entity IVR nodes included within the one or more IVR node paths associated with the intent IVR node, assemble one or more task-specific chatbot skills, each comprising (i) one of the intent IVR nodes, and (ii) at least some of the plurality of corresponding entity IVR nodes, wherein each of the task-specific chatbot skills is configured to perform one of the tasks by conducting a dialog with a user, and generate a chatbot comprising at least one of the task-specific chatbot skills.

There is also provided, in an embodiment, a computer-implemented method comprising: receiving, as input, an interactive voice response (IVR) tree, wherein the IVR tree is configured to implement one or more tasks, and wherein each of the one or more tasks is associated with one or more IVR node paths, each comprising a plurality of IVR nodes arranged in a hierarchical relationship within the IVR tree; analyzing the IVR tree to identify one or more intent IVR nodes, each associated with one of the tasks; with respect to each of the intent IVR nodes, identifying a plurality of corresponding entity IVR nodes included within the one or more IVR node paths associated with the intent IVR node; assembling one or more task-specific chatbot skills, each comprising (i) one of the intent IVR nodes, and (ii) at least some of the plurality of corresponding entity IVR nodes, wherein each of the task-specific chatbot skills is configured to perform one of the tasks by conducting a dialog with a user; and generating a chatbot comprising at least one of the task-specific chatbot skills.

There is further provided, in an embodiment, a computer program product comprising a non-transitory computer-readable storage medium having program instructions embodied therewith, the program instructions executable by at least one hardware processor to: receive, as input, an interactive voice response (IVR) tree, wherein the IVR tree is configured to implement one or more tasks, and wherein each of the one or more tasks is associated with one or more IVR node paths, each comprising a plurality of IVR nodes arranged in a hierarchical relationship within the IVR tree; analyze the IVR tree to identify one or more intent IVR nodes, each associated with one of the tasks; with respect to each of the intent IVR nodes, identify a plurality of corresponding entity IVR nodes included within the one or more IVR node paths associated with the intent IVR node; assemble one or more task-specific chatbot skills, each comprising (i) one of the intent IVR nodes, and (ii) at least some of the plurality of corresponding entity IVR nodes, wherein each of the task-specific chatbot skills is configured to perform one of the tasks by conducting a dialog with a user; and generate a chatbot comprising at least one of the task-specific chatbot skills.

In some embodiments, the program instructions are further executable to implement, and the method further comprises implementing, the chatbot by conducting the dialog with the user.

In some embodiments, each of the intent IVR nodes comprises a selection dialog node representing two or more options for selection by a user of the IVR tree, and wherein each of the intent IVR nodes is not immediately succeeded by another selection IVR node within the hierarchical relationship.

In some embodiments, each of the entity IVR nodes represents a variable value associated with the task associated with the intent IVR node.

In some embodiments, the chatbot is configured to select one of the task-specific chatbot skills for implementation, based, at least in part, on an intention statement input by the user, wherein the intention statement is input by the user in response to a prompt by the chatbot.

In some embodiments, the program instructions are further executable to implement, and the method further comprises implementing, one or more natural language processing (NLP) algorithms, to evaluate the intention statement, to (i) determine a semantic meaning of the intention message, and (ii) associate the intention message with one of the tasks.

In some embodiments, the dialog with the user comprises presenting one or more dialog prompts to the user, each configured to prompt the user to do at least one of: input a value, and make a selection.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 5A-5C and 6A-6D show examples of IVR trees associated with a financial institution and a sales data reporting function.

DETAILED DESCRIPTION

Figure 1:
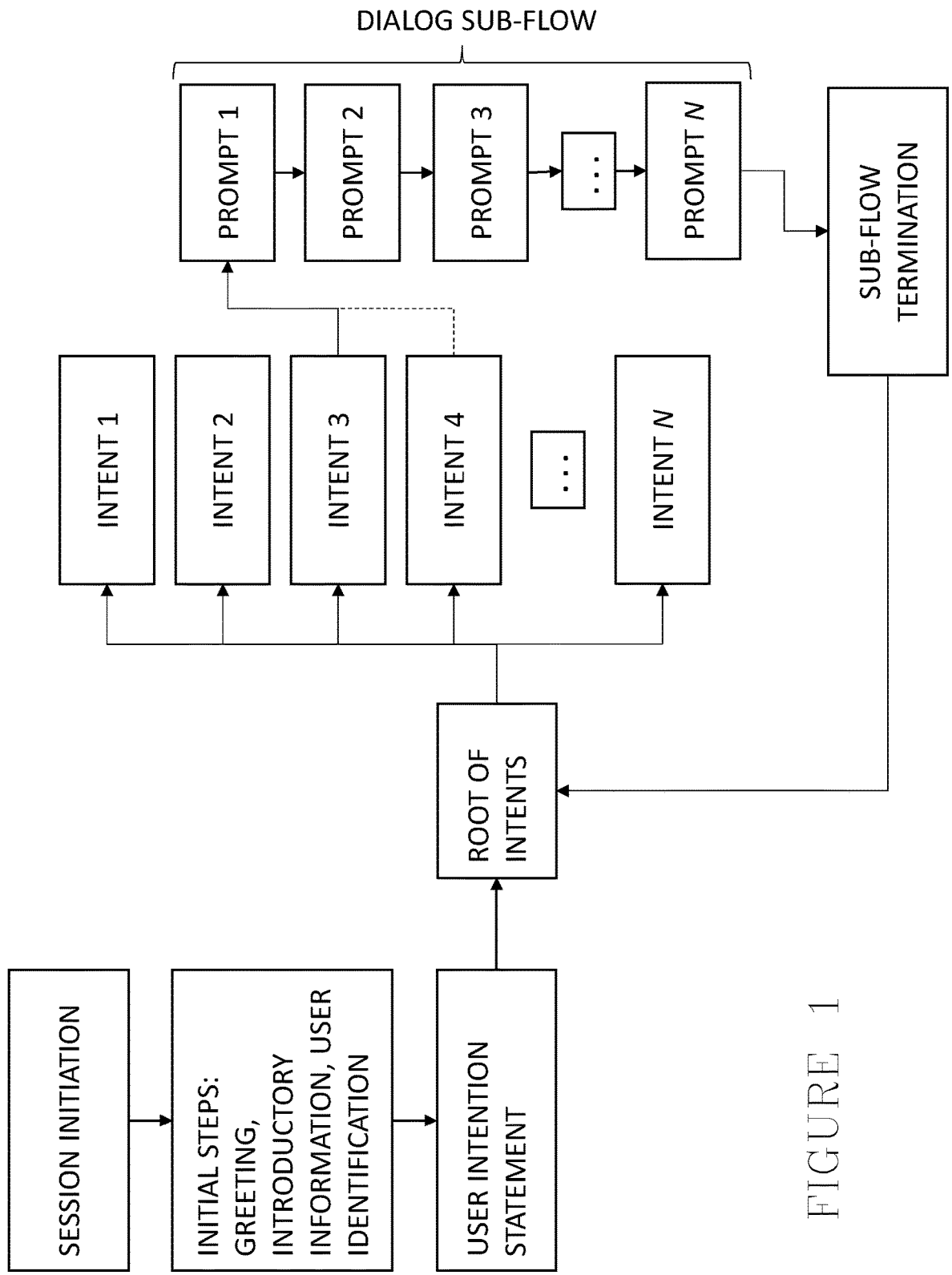
FIG. 1 is a schematic diagram illustrating a typical dialog tree in task-oriented chatbots.

Disclosed herein is a technique, embodied in a system, method, and computer program product, for automated generation of a chatbot application from a provided interactive voice response (IVR) tree. In some embodiments, the present disclosure provides for transforming a provided IVR tree into a chatbot 'skill,' i.e., a task-oriented chatbot within a specified domain, which comprises a pre-created bundling of chatbot components, e.g., servicing intents, entities, response scripts, context variables, and/or a dialog tree, associated with a particular task.

In some embodiments, the present disclosure provides for analyzing a provided IVR tree to identify servicing intents, entities, context variables, and dialog flow. In some embodiments, the present disclosure then provides for automatically generating a task-oriented chatbot implementing the IVR tree. In some embodiments, the generated chatbot is configured to offer users a dialog with prompts corresponding to possible servicing intentions for engaging with the chatbot, so as to enable the user to receive assistance without the need to interact with a human agent.

As used herein, a 'chatbot' may refer to a software application used to conduct an on-line chat conversation via text or speech (with a text-to-speech engine to convert bot utterances, and a speech-to-text engine to convert user utterances) with a user, e.g., in lieu of providing direct contact with a live human agent. A chatbot may be designed to simulate the way a human would behave as a conversational counterpart. Chatbots are used in dialog systems for various purposes including customer service, request routing, or information gathering. Chatbot applications may rely on using word-classification processes, natural language processing techniques, and/or machine learning techniques. Typically, chatbots are accessed on-line, e.g., via website popups, messaging applications (such as Facebook Messenger or WhatsApp), or through virtual assistants. Chatbots may use several modules, referred to as 'skills,' each adapted to handle a specific task within a specified domain.

The terms 'servicing intent,' 'intent,' or 'intention' may refer interchangeably to one or more contextual reasons for a user to contact a customer care facility. For example, if a user calls a customer care facility for paying a bill, then the 'intent' may be recognized as 'payments.' Similarly, if a user engages in an interaction with a customer support representative for disputing a charge on the bill, then the intent may be recognized as 'disputes.'

In a typical IVR system, it is the key role of the IVR sub-system to interact with the user, understand the user intention, gather the additional information (variables) that are necessary to implement the user intention, and send the gathered information to the backend application for implementing the task that fulfills the user intention. However, IVR systems typically require the user to use a very specific grammar, for which the speech recognition system in such IVRs is trained (often referred to as directed-voice IVRs). This constrains the user to speak these specific terms when using the IVR system. Because such systems are restricted to recognizing only the specific set of terms within the grammar for an action, this may lead to a conflict between the need to provide the customer with the freedom to speak their intent, and the accuracy of the system. For example, because typical IVR systems can encompass many different tasks, the process of ascertaining the particular goal of a user can be cumbersome and involves multiple recognition points, which may lead to user frustration.

In the case of a chatbot, the interaction with the user is different: the tedious and rigid hierarchical structure, based on touch tones and/or simple keywords/key-phrases, is replaced with a more flexible and convenient interaction using natural language, in text or speech.

The present technique, advantageously, provides for automatically transforming an IVR tree into a chatbot, thus improving user experience and the overall speed and efficiency of user interactions within the context of customer service and care.

In a task-oriented chatbot configured to interact with and serve human users, a dialog takes place between the user and the chatbot in text or speech, with the purpose of helping the user to fulfill one or more intentions (for example, reset a password associated with a bank account).

A chatbot session typically consists of a 'dialog' between a human user and the chatbot, comprising a series of user inputs and chatbot responses. Text or speech entered by the user is considered 'input,' and text or speech received from the chatbot in response is considered a 'response.'

In a typical chatbot dialog, the user initiates the dialog by contacting the chatbot, e.g., through a web interface, a mobile application, a messaging application, or by placing a phone call when the interface is speech-based. The chatbot typically greets the user and asks for the purpose of the user. The user answers by entering text or speech which describes the purpose of the user-initiated session. The chatbot analyzes the input, and provides a response.

Thus, a dialog sequence of input-response may proceed until the user's intention is fulfilled, or until the chatbot reaches to conclusion that it cannot fulfill the intention. In the latter case, the chatbot may transfer the dialog to a human representative, initiate a succeeding dialog by asking the user for another intention, or terminate the dialog altogether.

The analysis by the chatbot of the user input is configured to detect intents and entities in the input. 'Intents' reflect the user's intention at each stage of the dialog (e.g., selecting an option from a list of options). The purpose of the analysis is to classify an 'intent' input into one or more of a predefined set of intents, which represent the entire set of intentions handled by the chatbot skill (workspace). 'Entities' reflect variable values that are needed to handle intents, such as numbers, names, addresses, yes/no responses, and the like. Entities are typically recognized by keywords or keyphrases.

FIG. 1 is a schematic diagram illustrating a typical dialog tree in task-oriented chatbots, consisting of the following elements:

Session Initiation: Initial user submission.

Initial Steps: Greeting, introductory information, and user identification (optional).

User Intention Statement: The chatbot may request the user to define the overall intention of the session, typically, in the form of a question (e.g., "How can I help you?"). This step typically does not involve an oriented input/response dialog tree. Rather, the user may define the intention using natural language utterance, which may consist of one or more sentences.

Root of Intents: After the user enters an intention statement input, the chatbot may detect in the input one or more specific intents of the user, and correlate each of the detected intents with one of the recognized intents of the chatbot (e.g., Intent 1, Intent 2, . . . , Intent N in FIG. 1). The chatbot may potentially also detect entities in the utterance.

Dialog Sub-Flow: Once a particular intent is recognized, the chatbot uses a dedicated dialog sub-flow associated with the particular intent (e.g., Intent 3 in FIG. 1). In the course of the dialog session, the chatbot may gather from the user the entities and optionally additional auxiliary intents that are required for the fulfillment of the above user intent (e.g., Intent 3 in FIG. 1), using for example a series of prompts and analyzing the corresponding user's inputs.

Sub-Flow Termination: Once the particular intent has been fulfilled or handled according to the specific dialog sub-tree or sub-flow, the chatbot will typically terminate the dialog sub-flow.

Subsequent Dialog Sub-Flow: The chatbot may return to the root of intents, to initiate a new dialog sub-flow associated with another intent recognized in the initial user intention statement (e.g., Intent 4).

In some embodiments, a chatbot of the present disclosure may be associated with a particular enterprise (e.g., a financial institution, a healthcare organization, an e-commerce platform), may be connected to a backend system or application of the enterprise. The backend system may be implemented on one or more servers, databases, and/or cloud resources. In some embodiments, the connection with the backend system may enable the chatbot to obtain information necessary to handle the dialog with the user, for example:

User identification,
user authentication,
user personal details, and/or
user service history.

Thus, for example, following the conclusion of a sub-dialog associated with a particular intention, or within the course of the sub-dialog, the chatbot may send the intent details along with values obtained for related entities and optionally additional auxiliary intents, as gathered from user input, to perform the actions required to fulfill the user goal/intention. The chatbot main task is, therefore, to recognize each intent, and potentially one or more auxiliary intents that complement it, for a complete understanding of the user goal/intention, as well as all the values of the entities that are needed to fulfill the goal. Once recognized, the chatbot transmits the intents and the necessary values of the entities (variables), and sends the information to the backend application, for further processing of the intended task.

Figure 2:
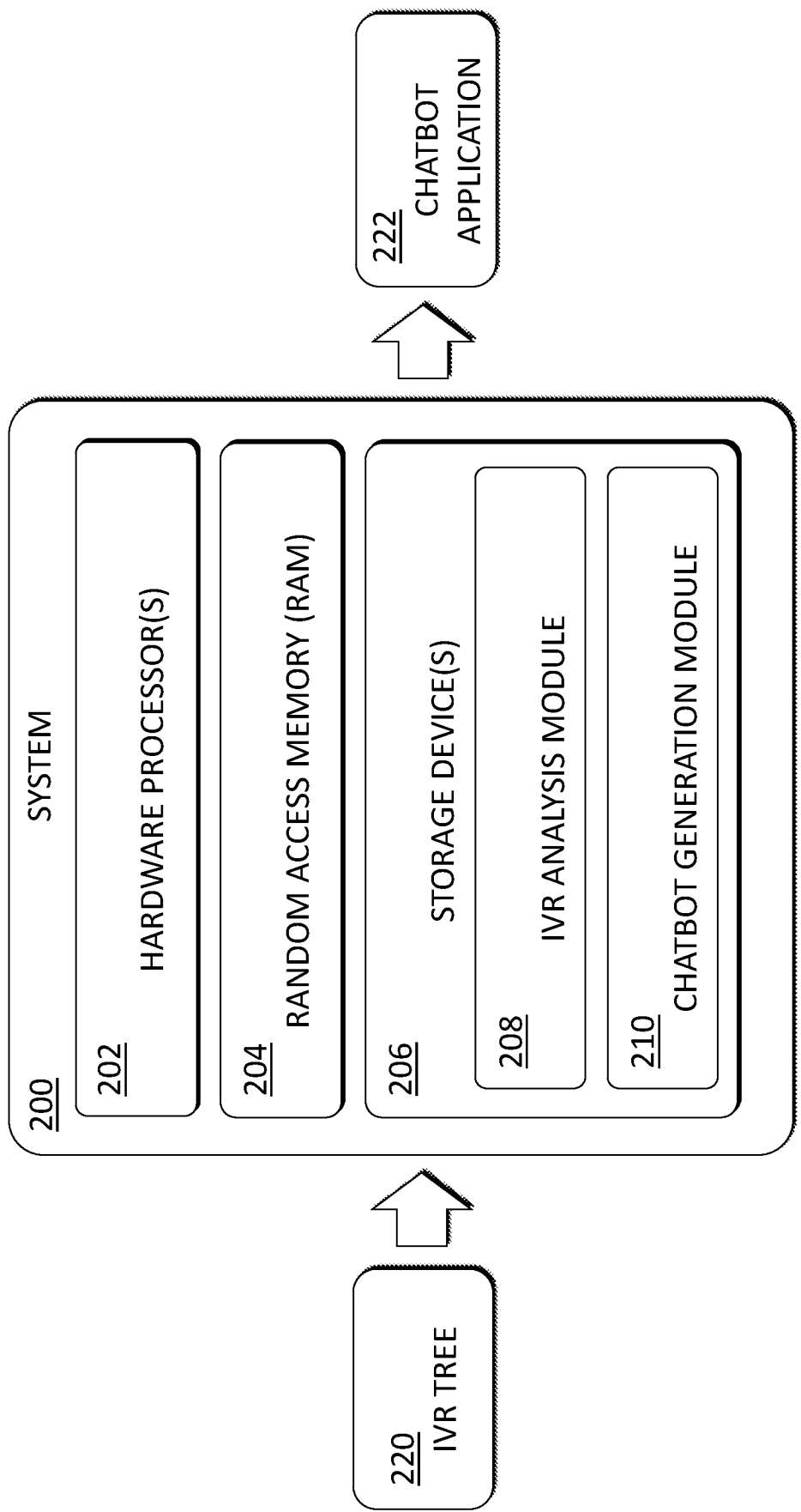
FIG. 2 shows a block diagram of an exemplary system for automated generation of a chatbot application from a provided interactive voice response (IVR) hierarchical tree, according to an embodiment.

FIG. 2 shows a block diagram of an exemplary system 200 for automated generation of a chatbot application from a provided interactive voice response (IVR) hierarchical tree, according to an embodiment. System 200 may include one or more hardware processor(s) 202, a random-access memory (RAM) 204, one or more non-transitory computer-readable storage device(s) 206, and a user interface 212. Components of system 200 may be co-located or distributed, or the system may be configured to run as one or more cloud computing 'instances,' 'containers,' 'virtual machines,' or other types of encapsulated software applications, as known in the art.

Storage device(s) 206 may have stored thereon program instructions and/or components configured to operate hardware processor(s) 202. The program instructions may include one or more software modules, such as an IVR analysis module 208 and/or a chatbot generation module 210. The software components may include an operating system having various software components and/or drivers for controlling and managing general system tasks (e.g., memory management, storage device control, power management, etc.), and facilitating communication between various hardware and software components.

System 200 may operate by loading instructions of IVR analysis module 208 and/or chatbot generation module 210 into RAM 204 as they are being executed by processor(s) 202.

In some embodiments, the instructions of IVR analysis module 208 may cause system 200 to receive an IVR tree 220, process it, and output a collection of intents and entities that were identified from the IVR tree, based on the IVR tree structure and the IVR prompts. In some embodiments, the instructions of chatbot generation module 210 may cause system 200 to generate a chatbot application 222 using the information received from IVR analysis module 208. In some embodiments, the analysis by the analysis module 208 may also be configured to infer the chatbot dialog structure.

In some embodiments, system 200 may implement one or more natural language processing (NLP) algorithms, which may include program instructions configured to receive and process incoming dialogue messages and determine a meaning of the incoming dialogue message.

In some embodiments, system 200 may include one or more processors and one or more NLP databases, which may be any suitable repository of NLP data, stored, e.g., on storage device(s) 206. In some embodiments, NLP algorithms and models implemented by system 200 may be trained to recognize intent, using, e.g., a dataset comprising training examples. In some embodiments, such training dataset may be domain-specific, e.g., associated with a specified business area of customer service (e.g., wireless phone services, banking, or retail); a specified vendor (e.g., Amazon, Verizon); and/or a specified customer service area (e.g., billing, technical support).

Upon receiving and processing an incoming dialogue message, an NLP algorithm may output the meaning of an incoming dialogue message in a format that other application can process. For example, an NLP algorithm may receive an incoming dialogue message stating "Hello, I would like to know my account balance please," and may determine that this statement represents a request for an account balance. In certain example implementations, an NLP algorithm may be configured to output an event representing the meaning of the incoming dialogue message to an event queue for processing by another application, e.g., a backend application. In some embodiments, an NLP algorithm may be configured to do the reverse, i.e., generate a natural language phrase in response to receiving a command. Accordingly, in some embodiments, an NLP algorithm may be configured to output an event that contains data representing natural language dialogue.

In some embodiments, an NLP algorithm used by system 200 may be used to implement an NLP system that can determine the meaning behind a string of text or voice message and convert it to a form that can be understood by other applications. In some embodiments, an NLP algorithm includes a natural language understanding component that generates an intent token based on analyzing user utterances.

In some embodiments, a chatbot generated by system 200 may be implemented using any suitable computing device, e.g., without limitation, a smartphone, a tablet, computer kiosk, an automated teller machine (ATM), a laptop computer, a desktop computer, etc. Such device may include a user interface that can accept user input from a customer. In some embodiments, a chatbot generated by system 200 may be implemented as a software application, e.g., as a messaging or chat program, a script implemented within an internet website, an add-on to a web browser, etc.

System 200 as described herein is only an exemplary embodiment of the present invention, and in practice may be implemented in hardware only, software only, or a combination of both hardware and software. System 200 may have more or fewer components and modules than shown, may combine two or more of the components, or may have a different configuration or arrangement of the components. System 200 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 200 may be co-located or distributed, or the system may be configured to run as one or more cloud computing 'instances,' 'containers,' 'virtual machines,' or other types of encapsulated software applications, as known in the art. As one example, system 200 may in fact be realized by two separate but similar systems, one with IVR analysis module 208 and the other with chatbot generation module 210. These two systems may cooperate, such as by transmitting data from one system to the other (over a local area network, a wide area network, etc.), so as to use the output of one module as input to the other module.

Figure 3:
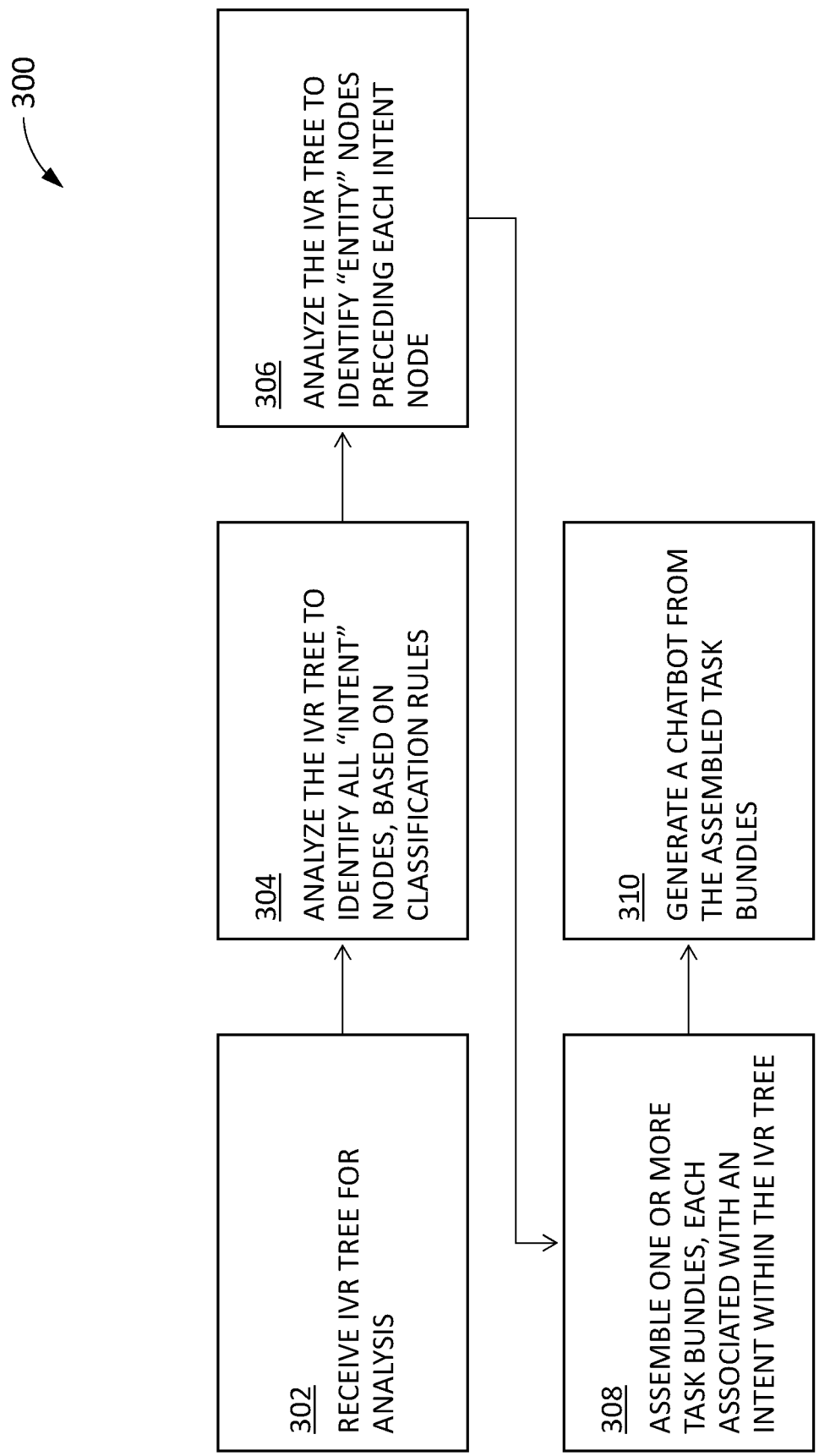
FIG. 3 illustrates the functional steps in a method for automated generation of a chatbot application from a provided interactive voice response (IVR) hierarchical tree, according to an embodiment.

The instructions of IVR analysis module 208 and/or chatbot generation module 210 are now discussed with reference to the flowchart of FIG. 3, which illustrates the functional steps in a method 300 for automated generation of a chatbot application from a provided interactive voice response (IVR) hierarchical tree, according to an embodiment.

The various steps of method 300 may either be performed in the order they are presented or in a different order (or even in parallel), as long as the order allows for a necessary input to a certain step to be obtained from an output of an earlier step. In addition, the steps of method 300 are performed automatically (e.g., by system 200 of FIG. 2), unless specifically stated otherwise.

In some embodiments, in step 302, the present disclosure provides for receiving an IVR tree representing a series of hierarchically-related menu layers, each comprising one or more prompts for a user to enter information or make a selection.

In some embodiments, in step 304, the present disclosure may be configured to operate, e.g., IVR analysis module 208, to analyze the received IVR tree, to recognize one or more intents represented by the IVR tree and/or a one or more dialog paths or sub-trees within the IVR tree. In some cases, an IVR tree may include more than one 'intents,' each represented by a particular dialog sub-tree or dialog path within the larger IVR tree. For context, an IVR system for a financial services enterprise may be designed to perform multiple user-requested tasks (e.g., providing account balance, updating user profile details, cancelling a lost credit card, etc.). Accordingly, the IVR tree for such a system may include multiple possible tree dialog paths (or sub-trees), each ultimately associated with fulfilling a specific user 'intent.'

Accordingly, in some embodiments, IVR analysis module 208 may be configured to analyze the received IVR tree, to recognize all intents embedded in the IVR tree, to generate a 'root' of intents representing a list of intents embedded in the IVR tree. In some embodiments, the list of intents can be predefined, as determined from the analysis of the IVR tree. In yet other embodiments, additional intents can be added, including by automatically analyzing the conversations that take place with users, automatically identifying user goals that are not served by the predetermined intents from the IVR tree analysis, and adding appropriate intents to serve the new identified goals.

In some embodiments, recognizing the one or more intents associated with the IVR tree or any sub-tree thereof comprises identifying IVR tree nodes which are classified as 'intent' nodes, based on a one or more classification rules. In some embodiments, intents may be associated with nodes in the IVR tree wherein an output represents a selection among multiple options, e.g., from a list. For example, a menu prompt in a bank IVR system may direct a user to select among the following options:

"To activate your credit card, please press 1"

"To cancel your credit card, please press 2"

"For more options, please press 3"

Thus, intention selection may typically begin with a 'To' or 'For' statement, which reflects the desired output associated with a particular selection.

However, not every selection prompt or node within an IVR tree represents an actual 'intent' embedded in an IVR tree or any sub-tree, i.e., a contextual reason for which the user initiated the contact. For example, if a user calls a customer care facility for paying a bill, then the 'intent' may be recognized as 'payments.' However, the dialog path within the IVR tree associated with a 'payment' intent may include intermediate selection nodes prompting the user to make selections that do not result in the ultimate desired output. Such intermediate selection nodes may lead to further downstream information gathering nodes, or to nodes with no associated input (e.g., a greeting, an explanation, a general information, a confirmation, etc.).

Accordingly, in some embodiments, IVR analysis module 208 may only classify those IVR tree nodes that are the 'deepest' or ultimate selection nodes within a particular tree dialog path, as 'intent' nodes. In such cases, the intent represented by the node may be defined as the predetermined IVR response associated with the selection nodes. It should be noted that 'intent' nodes may still have downstream auxiliary selection nodes, or nodes intended for information input, general information provision, etc. However, 'intent' nodes cannot have downstream nodes that are selection nodes immediately following it.

Figure 4:
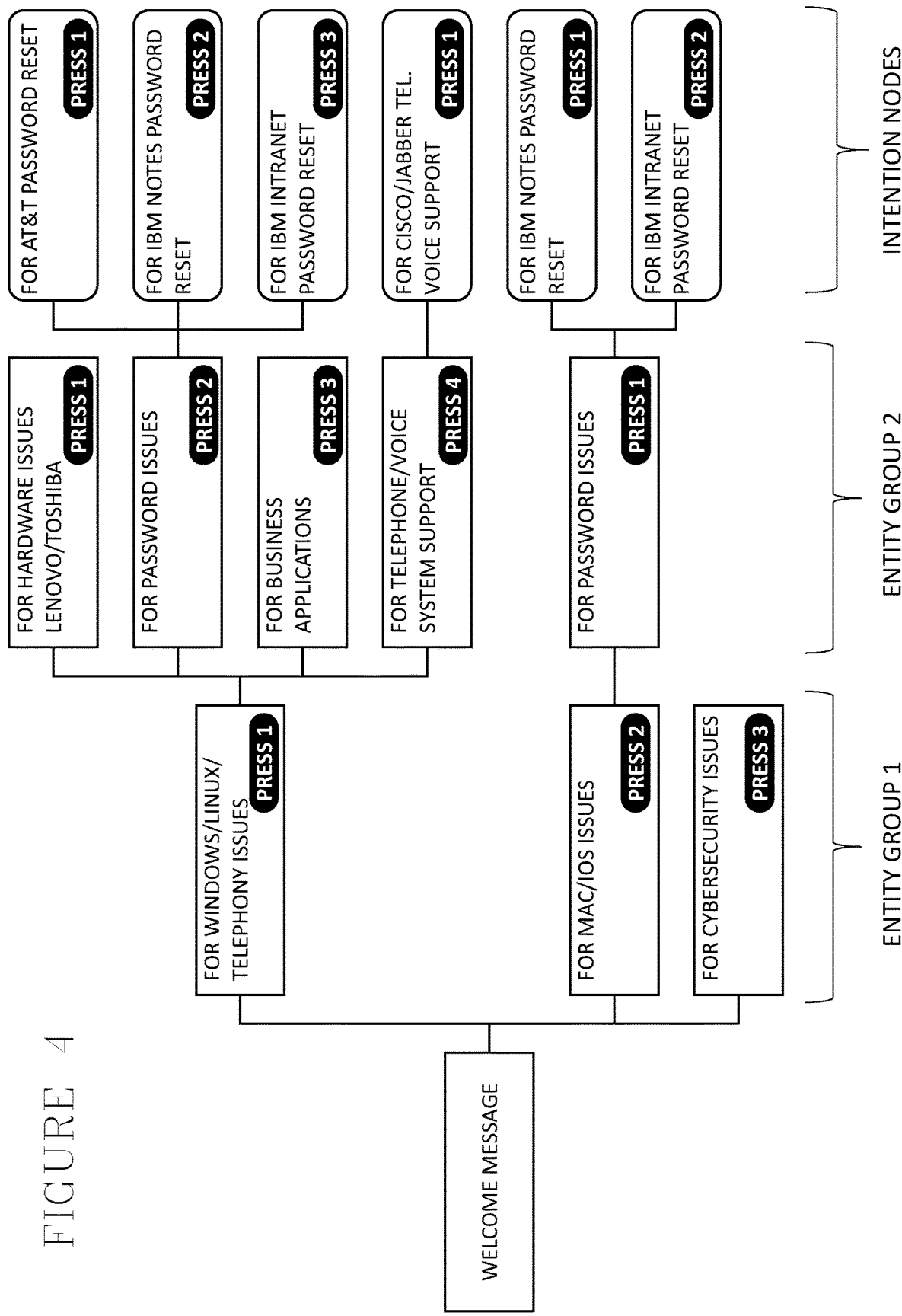
FIG. 4 is an example of an IVR tree associated with a technical support function by a service provider.

FIG. 4 is an example of an IVR tree associated with a technical support function by a service provider. When a user wishes to reset an AT&T password, the user must first make a selection within Entity Group 1 between 3 menu options (in this example, Windows/Linux/Telephony, MAC/iOS, and Cybersecurity). The nodes in Entity Group 1 are not identified as intent nodes, because they have downstream nodes which are further selection nodes immediately following them. The user then must select option "1" (Windows/Linux/Telephony) and is again prompted to select from among 6 different menu options within an Entity Group 2. The nodes in Entity Group 2 are similarly not identified as intent nodes, because they have downstream nodes which are further selection nodes immediately following them. When the user selects "2" (Password Issues), the user is prompted to make a final selection from three options within the Intention Nodes. The Intention Nodes are not followed by additional downstream selection nodes immediately following them, and are therefore designated as 'intent' nodes. Although this IVR tree included three selection layers, only the ultimate one actually represents the overall 'intent' of the user—e.g., to reset an AT&T password.

As can be seen, nodes in Entity Groups 1 and 2 may be used to infer the context of the ultimate intent of a sub-flow. For example, with continued reference to FIG. 4, the intents "IBM Notes Password Reset" and "IBM Intranet Password Reset" appear in two different sub-flows—the first is the "Windows/Linux Telephony Issues" sub-flow, and the second is the "MAC/iOS Issues" sub-flow. Thus, the context of the intent (i.e., which sub-flow is associated with the intent) may be inferred from entities within each of the sub-flows. For example, nodes in Entity Groups 1 and 2 may help to infer whether user wishes to reset an AT&T password in the context of a "Windows/Linux Telephony Issues" or "MAC/iOS Issues." In some cases, at least some of the entity nodes in a sub0flow may be ultimately superfluous. For example, Entity Group 1 may provide a context of an intent (e.g., "Windows/Linux/Telephony Issues"), however, the context provided by Entity Group 2 (e.g., "Password") may be redundant, because the intent node (e.g., "AT&T Password Reset") includes a direct reference to the intent (resetting a password). Thus, the intent of the sub-flow could be inferred from using only the relevant Entity Group 1 node and the ultimate intent node. In the corresponding transformation into a chatbot skill, this intent may be directly obtained from the user, for example, after understanding that the user wants to reset an IBM-related password, the chatbot dialog may prompt the user to confirm which system is involved, for example: "Are you referring to Windows, Linux, Telephony, or MAC?", to understand in which context password reset is required.

Figure 5A:
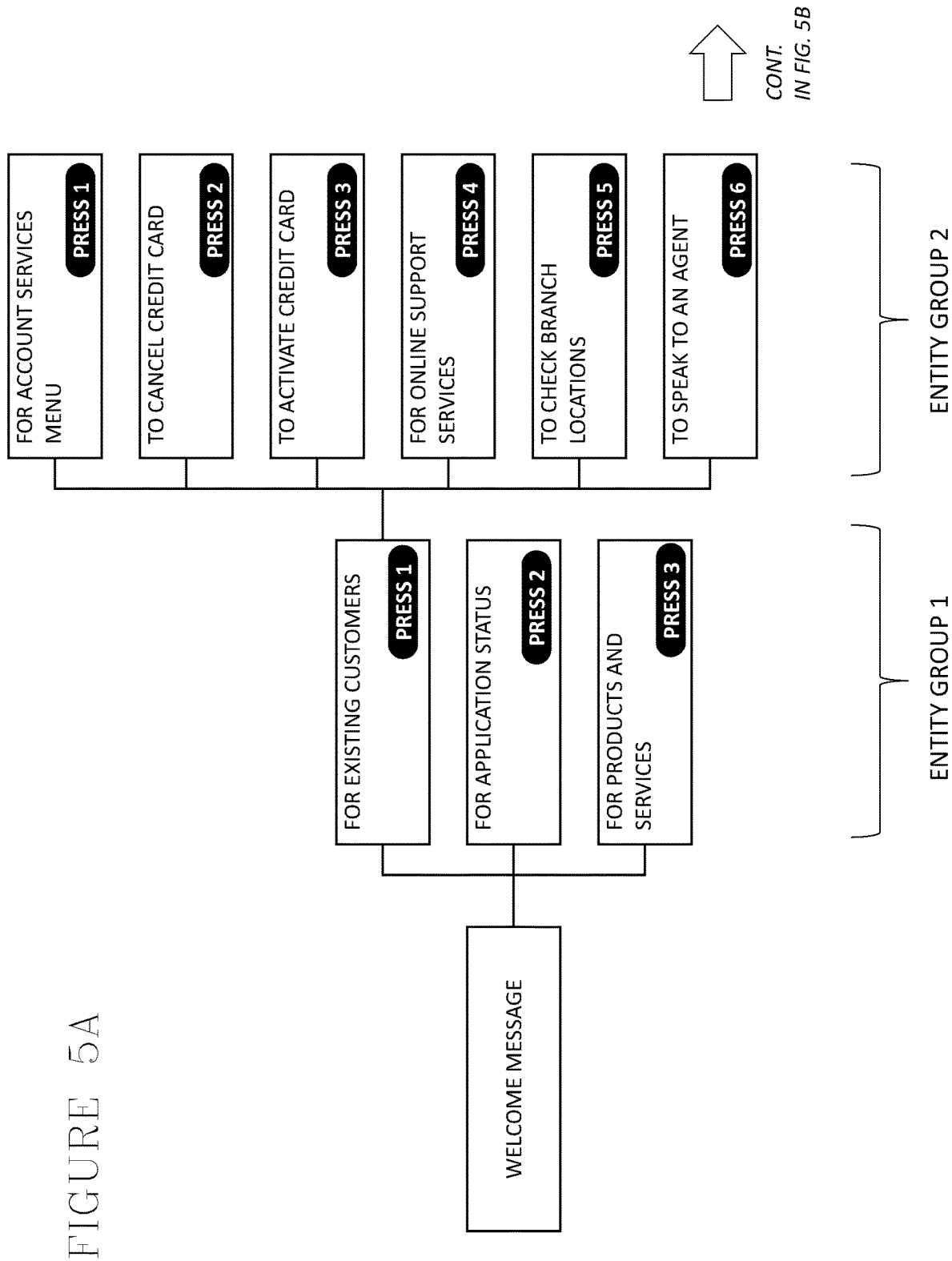
Figure 5B:
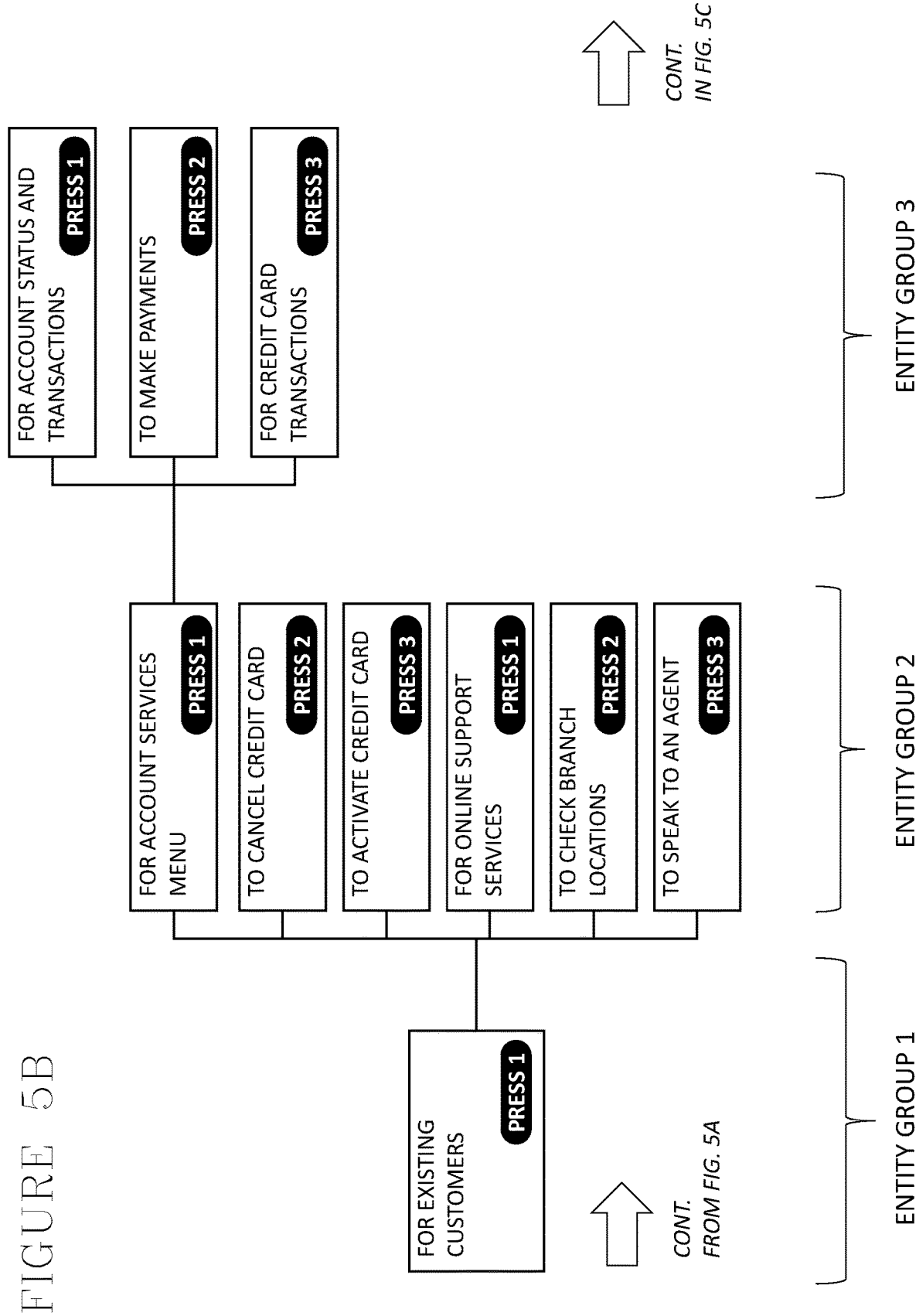
Figure 5C:
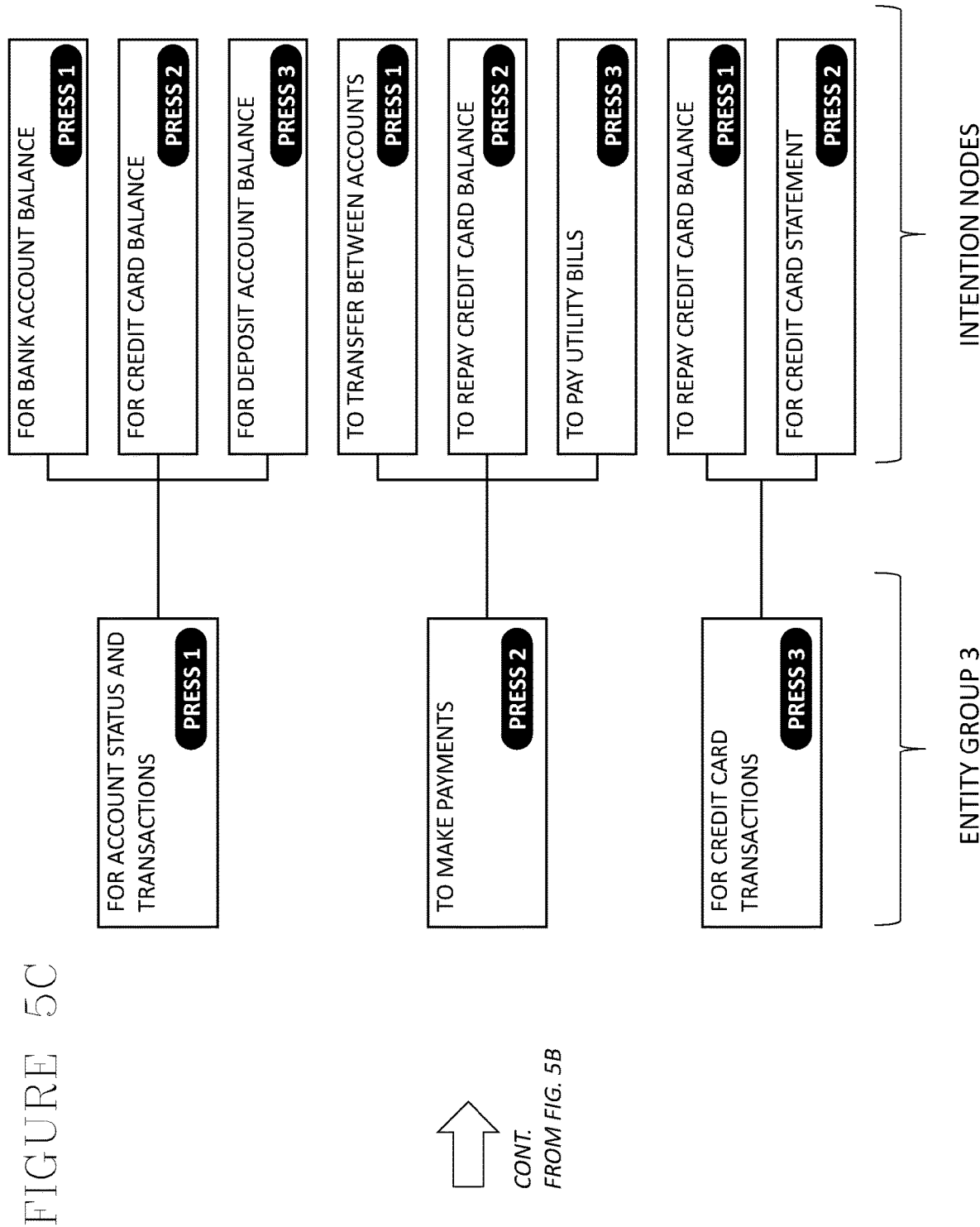

Another example is shown in FIGS. 5A-5C. A banking customer wishing to know the balance in their banking account must traverse multiple selection layers, as well as one or more intermediate steps, such as identification steps (for example, to provide an identification or PIN number), before reaching the main intention nodes. For example, after the Entity Group 1 selections, there are Entity Group 2 selections, because there are additional selection nodes immediately after these nodes, as can be seen in FIG. 5B. For example, selection item "For Account Services Menu" is considered to be an entity, part of Entity Group 2, because it has further selections immediately after it. However, certain nodes in Entity Group 2 may be considered to be intent, because there are no further selection nodes immediately following. For example, "To Speak To An Agent" or "To Check Bank Location" are considered to be intents, because they have no further selection immediately following.

Next, there is a subsequent group of entities, Entity Group 3, with nodes that have again more selection nodes immediately following, as can be sees in FIGS. 5B and 5C. Downstream from Entity Group 3, there are intention nodes, shown in FIG. 5C, that have no further selection nodes immediately following. For example, "For Bank Account Balance" and "For Credit Card Balance" are final selection nodes. From the prompts in each intention node, the intention (or the intent) is inferred, and the entities before it along the path to the intent provide the context. Not all the Entities along the path to the intents are "true" entities, in the sense that they provide actual useful context. Some of these Entities can be for the purpose of the IVR selection only, and add no new information when the chatbot flow is considered. For Example, the intent "For Bank Account Balance" in FIG. 5C provides sufficient information to determine the user intention, without any further context required. Thus, the Entity nodes that lead to this intent ("For Account Status And Transactions", "For Account Services Menu", and "For Existing Customers") are in fact redundant, and can be either left as entities or be omitted, depending on any entity filtering logic that can be applied to remove redundant entities.

Thus, in some cases, the intent may be interpreted from the node heading, wherein, for example, prepositions such as "for," "to," and the like may be removed from the text, to infer a semantic meaning of the node. Next, there may be one or more input nodes, which may be designated as entity nodes, e.g., for identification purposes. This entity may, for example, collect a credit card number and/or another relevant identification number. Then, one of more auxiliary intents may be identified, such as "Account Status And Transactions," "Make Payments," "Credit Card Transactions," etc. When the user is asked for his/her intention, at the root of intents, the user's input is typically evaluated against all the intents, including the auxiliary intents, and therefore it would probably find an intent like "Make Payments" or "Credit Card Transactions" rather than the intent "Account Services Menu," which is redundant in the chatbot dialog structure. But to keep the automatic method of the chatbot creation simple, the intent "Account Services Menu" may be kept as well. Thus, as all the intents are scanned for in the root, depending on the user input, the deeper intent from the IVR tree can be selected immediately in the chatbot conversation, and the "Account Services Menu" intent would be skipped over. Later, during deployment, the system can identify that the intent "Account Services Menu" is not in use and remove it.

In some embodiments, intent and entity nodes may be defined and assigned semantic meaning based on analyzing the corresponding prompt texts in the IVR tree, after removing prepositions and similar parts of speech, such as "for," "to," "in," "from," etc. A further example is shown in FIGS.

Figure 6A:
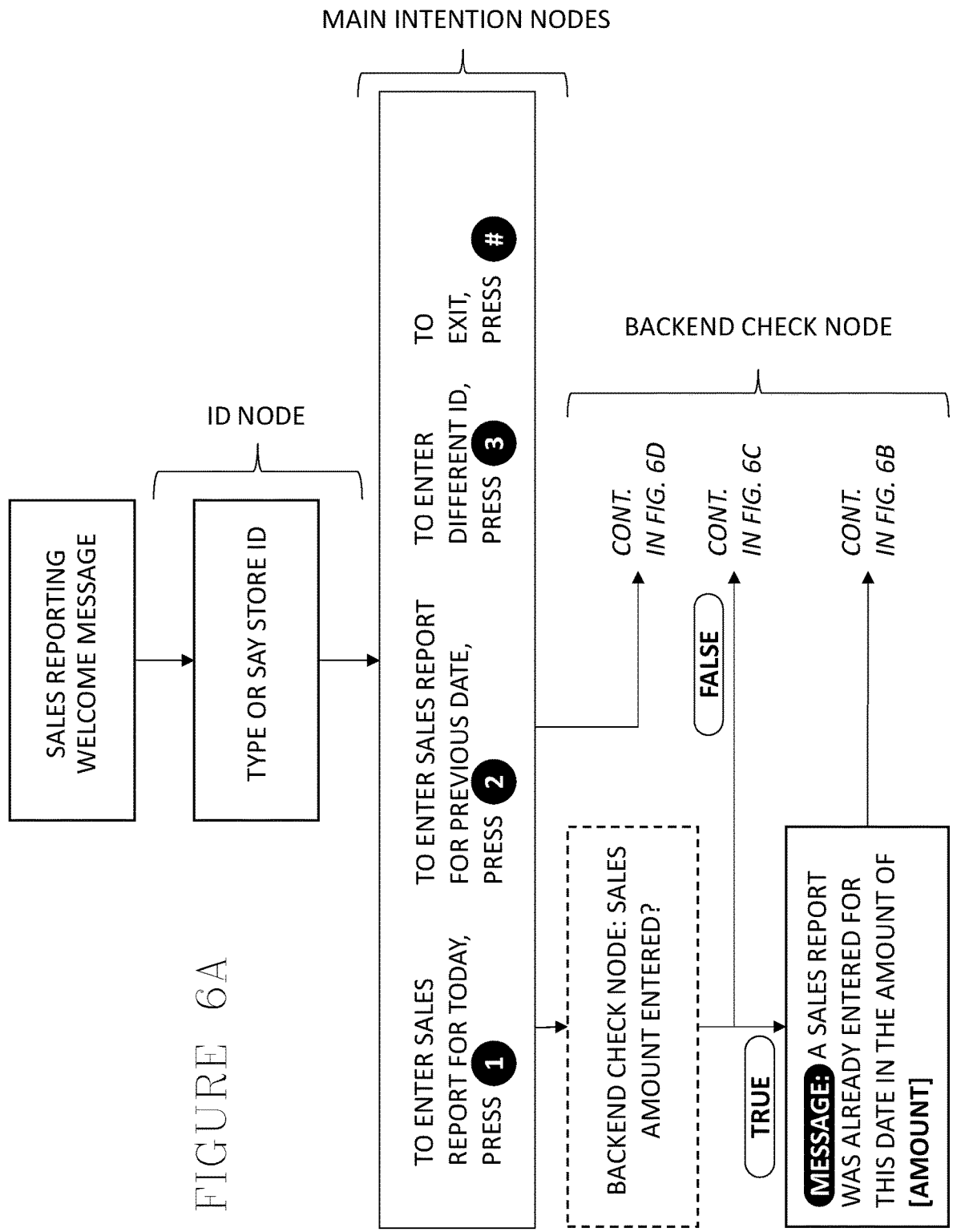

6A-6D, in the context of a sales data reporting IVR tree. For example, the IVR tree presented in FIGS. 6A-6D may include a scheme for reporting sales data. As can be seen in FIG. 6A, after a welcome message and an identification step (an entity node), the user is presented with a first 'intent' selection node prompting the user to make a selection with respect to the date for which sales are to be reported:

1: Enter a sales report for today's date.
2: Enter a sales report for a previous date.
3: Enter a different ID.
: Exit.

This node may be designated as an 'intent' node, because it is only followed by information gathering and/or confirmations nodes.

In a typical chatbot dialog flow based on the IVR in the example of FIG. 6A, the four intent selection nodes may be replaced with dialog messages to the user, such as:

"Would you like to enter a sales report for today, select a previous date, use a different store ID, or exit?"

IVR analysis module 208 may then evaluate the user's response, which may be in text or speech, to detect the user's intent. The analysis may involve, e.g., NLP methods. In cases where the intent node comprises a larger number of intents, the dialog question from the chatbot may be phrased as:

"What would you like to do?"

or

"How can I help you?"

IVR analysis module 208 may again evaluate the user's response, which may be in text or speech, to detect the user's intent, based on the known/recognized intents in the root of intents of the IVR tree (e.g., as shown in FIG. 1). In some embodiments, IVR analysis module 208 may potentially also detect entities in the utterance.

Following the user's selection, one or more information gathering steps may be performed depending on the selected intent, wherein the user may be prompted to enter one or more variables, e.g., amounts, dates, and/or yes/no responses. In some cases, downstream confirmation nodes may include a selection task for the user (e.g., "1" to confirm that an entry is correct, "2" to designate an entry as incorrect). However, these "simple" selection nodes which essentially require a yes/no type of user input, can typically be treated as information gathering nodes, rather than 'intent' nodes.

When the user selected option "1," as noted above, a backend check node may determine whether a condition has been met, in a way which may be transparent to the user. For example, when a user selects option "1" (to enter today's sales numbers), the IVR may be configured to check whether an entry has already been made for today's date, and if so, alert the user accordingly. If the check yields a "false" return, the IVR flow continues to perform data collection steps. Backend check steps are not considered to be "entity" steps, because they do not involve any user input. These steps are typically a behind-the-scenes checks which determines how the flow will continue. In the example of FIG. 6A, the "true" branch leads to a user message which requires no user input in return. In the corresponding transformation into a chatbot skill, this node becomes a yes/no entity. Thus, in the case of a chatbot based on the IVR, the chatbot may be configured to obtain the value of a binary entity node by prompting the user with suitable prompt, typically in the form of a question, such as, "Is this correct?" or "Do you approve?" The binary intent (i.e., yes/no) may be inferred from the user's natural language response (e.g., "yes," "correct," "that's correct," "I confirm," or any other similar natural language response carrying an affirmative or negative semantic meaning, as the case may be).

IVR trees may include other types of no-input nodes, which may be performed completely in the backend, and may not involve any message or another output to the user. Although these nodes are not "intent" or "entity" nodes per-se, they are crucial to understanding the dialog flow of the IVR or a particular sub-tree thereof.

Figure 6B:
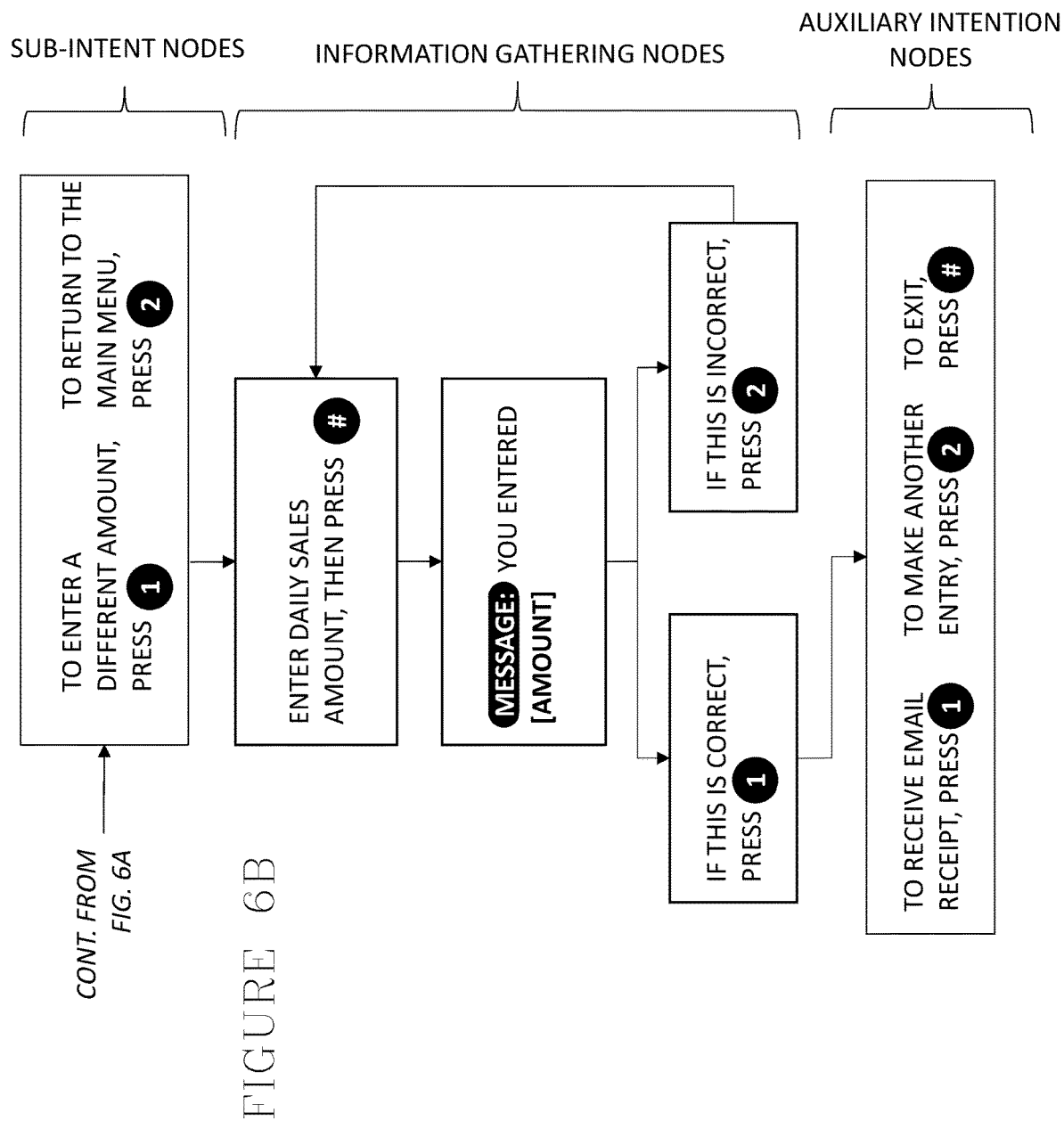

FIG. 6B shows a sub-flow based on option "1"—Enter a sales report for today's date, wherein the backend check node has returned a "true" value, meaning that a sales report for today's date has already been entered. The user is then prompted to choose whether the user wishes to enter a different amount (by pressing "1"), or to return to the main menu (by pressing "2"). Again, the in corresponding chatbot skill, the user may be prompted with a question, which may be phrased as a specific list of options (e.g., "Do you wish to enter a different amount or return to the main menu?"), or phrased as a general question (e.g., "How do you wish to proceed?"). The intent may be inferred by analyzing the user's natural language response (e.g., "different amount," "main menu," or any other similar natural language response carrying similar semantic meaning).

FIG. 6C shows a sub-flow based on option "1," wherein the backend check node has returned a "false" value, meaning that a sales report for today's date has not been entered yet.

In both cases shown in FIGS. 6B and 6C, the sub-flows include information gathering nodes, where the user is then prompted to enter a daily sales number, after which the entered number is reported back to the user for confirmation, with a binary selection prompt ("1" correct, "2" incorrect).

In some cases, an IVR tree can include further downstream auxiliary intent nodes: upon completion of the information gathering/confirmation steps, the user may be presented with a second 'intent' selection node prompting the user to select whether the user wishes to receive an email report, or to return to the first selection node and make another report. In some cases, a user selection in one of the downstream information gathering/confirmation/intent nodes may cause the user to return to the root of intents—to the first selection node, essentially to re-initiate the dialog by making a different selection and service a different goal.

Thus, when the user confirms that the entered number is correct, the user may be presented with a follow up or auxiliary intent node, prompting the user to select, e.g.

1: Receive an email receipt.
2: Make another entry.
: Exit.

If the user reports that the number is incorrect, the user is returned to the information gathering loop, to re-enter the number and re-confirm it.

As explained above, in the transformation to the corresponding chatbot skill, this node may be represented as a user prompt, wherein the user may be prompted with a question, which may be phrased as a specific list of options (e.g., "Do you wish to an receive email receipt, make another entry, or exit?"), or phrased as a general question (e.g., "How do you wish to proceed?"). The intent may be inferred by analyzing the user's natural language response (e.g., "receipt," "another entry," or "exit," or any other similar natural language response carrying similar semantic meaning).

In some cases, a selection node may have a binary selection option, e.g., a user may be prompted to select from between two options, typically a positive and negative pair of options (yes/no, agree/disagree, etc.). For example:

If you approve, press 1,

Otherwise, press 2.

As explained above, in the case of a chatbot based on the IVR, the chatbot may be configured to obtain the value of the binary selection by prompting the user with suitable prompt, typically in the form of a question, such as, "Is this correct?" or "Do you approve?" The binary intent (i.e., yes/no) may be inferred from the user's natural language response (e.g., "yes," "correct," "that's correct," "I confirm," or any other similar natural language response carrying an affirmative or negative semantic meaning, as the case may be).

In some embodiments, a binary selection node may be classified as 'intent' nodes as set forth above, i.e., when it is the 'deepest' or ultimate selection node within a particular tree dialog path, and does not have further downstream nodes that are selection nodes. However, in other embodiments, rather than classifying a binary selection node as an 'intent' node, it may be classified as an entity node having two optional values, such as true/false.

In some case, a two-option node may not be a true binary node, because the options do not fall into the category of yes/no or true/false. For example, nodes where one of the options is "return to the main menu" or "exit" are not true binary nodes, and may be treated as intent selection nodes.

FIG. 6D presents another sub-flow of the IVR, which is associated with option "2"—Enter a sales report for a previous date. The user is presented with one or more prompts asking the user to enter an alternate date, after which the entered date is reported back to the user for confirmation, with a binary selection prompt ("1" correct, "2" incorrect).

As explained above, in the case of a chatbot based on the IVR, the chatbot may be configured to obtain the value of the binary selection by prompting the user with suitable prompt, typically in the form of a question, such as, "Is this correct?" or "Do you approve?" The binary intent (i.e., yes/no) may be inferred from the user's natural language response (e.g., "yes," "correct," "that's correct," "I confirm," or any other similar natural language response carrying an affirmative or negative semantic meaning, as the case may be).

If the user reports that the date is incorrect, the user is returned to the information gathering loop, to re-enter the date and re-confirm it.

If the user confirms that the entered date is correct, the user may be presented with a follow up information gathering nodes, similar to those presented in FIGS. 6B-6C, where the user is then prompted to enter a daily sales number, after which the entered number is reported back to the user for confirmation, with a binary selection prompt ("1" correct, "2" incorrect).

When the user confirms that the entered number is correct, the user may be presented with the follow up or auxiliary intent node, prompting the user to select, e.g.:

1: Receive an email receipt.

2: Make another entry.

: Exit.

As explained above, in the transformation to the corresponding chatbot skill, this node may be represented as a user prompt, wherein the user may be prompted with a question, which may be phrased as a specific list of options (e.g., "Do you wish to receive an email receipt, make another entry, or exit?"), or phrased as a general question (e.g., "How do you wish to proceed?"). The intent may be inferred by analyzing the user's natural language response (e.g., "receipt," "another entry," or "exit," or any other similar natural language response carrying similar semantic meaning).

In some embodiments, in step 304, the present disclosure may be configured to operate, e.g., IVR analysis module 208, to analyze the received IVR tree, to identify one or more entity nodes associated with each intent recognized in step 304. In some embodiments, such entity nodes are associated with one or more variable values required for completion of a task reflected in the 'intent' of the IVR tree or a sub-tree thereof, e.g., the user intention for initiating a particular session.

By way of background, in a typical IVR system, many 'entities' are provided in the user input in the course of the IVR dialog consisting of a series of user inputs and chatbot responses. The text or speech entered by the user as input is used to provide the 'entities,' i.e., the variable values required for the completion of the task. These inputs are gathered and stored in the course of the dialog and are used by the connected backend application to implement the task that fulfills the user intention.

Conversely, in the case of a chatbot, which does not follow the rigid hierarchical structure of an IVR tree, the user is asked for the intent first, and once that intent is recognized, the user is presented with one or more prompts to enter variable values ('entities') which are required for fulfilling the task that the selected intent represents.

Accordingly, in some embodiments, in step 306, IVR analysis module 208 may be configured to identify all 'entity' nodes within a particular IVR tree dialog path or sub-tree, which precede an intent node of that dialog path or sub-tree. In some embodiments, IVR analysis module 208 may be configured to gather and store all the entities associated with each intent dialog path within the IVR tree. In some embodiments, an 'entity' represent by each entity node may be defined as the predetermined IVR response and/or a summary description associated with the entity node.

With reference back to the example in FIG. 4, as can be seen, each node in the Intention Nodes group is preceded by one or more potential tree dialog paths or sub-trees leading to such node, wherein these dialog paths include one or more entity nodes from Entity Groups 1 and 2. Similarly, in the example of FIGS. 5A-5C, each node in the Intention Nodes group is preceded by one or more potential tree dialog paths or sub-trees leading to such node, wherein these dialog paths include one or more entity nodes from Entity Group 1. In the example of FIGS. 5A-5C, the intention nodes may be succeeded by auxiliary intent nodes, as well as one or more information gathering nodes, such as identification steps.

In the example of FIGS. 6A-6D, there are more than one intention 'layers.' In each case, a node in the Intention Nodes groups may be preceded by one or more potential tree dialog paths or sub-trees leading to such node, wherein these dialog paths include one or more entities like identification step nodes and/or Information Gathering nodes.

Following is a discussion detailing exemplary results with respect to steps 304 and 306, wherein IVR analysis module 208 may yield the following classifications of nodes in a received IVR tree described in Figured 6A-6D:

ID Step: The ID step may be an entity node, where a user may be prompted to enter a variable store ID.

Backend check: The backend check node is transparent to the user and does not involve either user input or user selection, therefore, the backend check node may not be classified as either intent or entity nodes. However, this node may be important as a contextual node, to assist in classifying preceding and/or subsequent nodes in the relevant sub-flows, and for identifying the dialog flow that follows intents in the chatbot skill.

Main intent node: the main intent node is recognized as a selection node which does not have any further selection nodes, only information gathering and/or no-input nodes. However, in some case, there may be further auxiliary selection nodes in the downstream, though not immediately after it.

Entities/information gathering nodes: These includes nodes prompting the user to enter sales amounts and/or dates. These will be classified as "entity" nodes because they include user-entered variables to be retrieved from the user input.

Binary entity nodes: Binary nodes may present the user with a yes/no, true/false selection, e.g., to confirm a variable input by the user into the chat. In these cases a binary selection node may be classified as an entity node having two optional values, such as true/false.

Binary intent nodes: A binary selection node may be classified as an 'intent' node when it is the 'deepest' or ultimate selection node within a particular tree dialog path, and does not have further downstream nodes that are selection nodes. For example, the binary node which presents the user with two options:
1: Enter a different amount.
2: Return to the main menu.

Auxiliary intent node: Upon completion of the information gathering/confirmation steps of the main intent, the user may be presented with a second 'intent' selection node prompting the user to select a follow-up path, e.g., whether the user wishes to receive an email report, or to return to the first selection node and make another report. In some cases, a user selection in one of the downstream information gathering/confirmation/intent nodes may cause the user to return to the root of intents—to the first selection node, essentially to re-initiate the dialog by making a different selection and service a different goal.

With reference back to FIG. 3, in some embodiments, in step 308, chatbot generation module 210 may be configured to assemble a collection of 'tasks' associated with provided IVR tree, wherein each of said tasks comprises a bundling of components comprising:

At least one primary intent node,
potentially one or more auxiliary intent nodes,
all entity nodes associated with the primary intent and/or auxiliary intent nodes, and
potentially, output-only (e.g., response-only) nodes, such as greetings, explanations, answers to questions, information provided to the user, etc.

In some embodiments, each such 'task' may be represented by a particular dialog sub-tree or dialog path within the larger IVR tree.

In some embodiments, in step 310, chatbot generation module 210 may be configured to generate a chatbot from the collection of task bundles created in step 308. In some embodiments, such chatbot dialog structure may comprise:

Initial Steps: Greeting and introductory information.

ID step: An ID step may be intended to capture an ID value from the user, which may be input in text or speech. This step may be a preliminary step, or may be performed only after the user has made an intent selection, for greater efficiency.

User Intention Statement: Prompting the user to input a statement defining the overall intention of the session, e.g., via a prompt which expressly states all selection options, or via a prompt phrased as a general question (e.g., "How can I help you?"). The intention statement may aggregate all user intents from all sub-flows of the IVR tree in a single statement.

Recognizing User Intent: Associating the recognized user intent statement with one of the intents in the root of intents of the chatbot. User intent may be recognized using, e.g., one or more natural language processing (NLP) algorithms implemented by system 200, which may include program instructions configured to receive and process incoming dialogue messages and determine a meaning of the incoming dialogue message.

Resolving ambiguities: In some cases, IVR trees may include identical intents within different contexts. For example, with reference to FIG. 4, the intents "IBM Notes Password Reset" and "IBM Intranet Password Reset" appear in two different sub-flows— "Windows/Linux Telephony Issues" and "MAC/IOS Issues". The context of the intent (i.e., which sub-flow is associated with the intent) may be inferred from entities within the sub-flow and/or may be directly obtained from the user, e.g., after understanding that the user wants to reset an IBM-related password, the chatbot dialog will need to prompt the user to confirm which system is involved, for example: "Are you referring to Windows, Linux, Telephony, or MAC?", to understand in which context password reset is required.

Repeat Prompt: if the chatbot failed to recognize user intent from the initial intent statement, the chatbot may prompt the user to re-enter the intent statement, e.g., using a different phrasing or wording.

Task Sub-Flow: Implementing the task sub-flow associated with the recognized intent. In the course of the dialog sub-flow, prompting the user to input the necessary entities via one or more prompts and responses.

Intent Responses: The chatbot may provide validation request responses to recognized intents, using common chatbot/IVR phrasing (e.g., "I understand you want to reset your password" as a response to selecting "reset password" by the user). Such responses may be followed by confirmation nodes (e.g., "is this correct?")

Entity Prompts: Entity prompts may be given using common chatbot/IVR phrasing, e.g., "Please type (or say) your 8-digit ID number," or "Please type/say your phone number using the 10-digit format."

Generally, the chatbot dialog will include all entities which are present within an IVR sub-flow associated with an intent. However, in some cases, the entity values may be inferred directly from the user response to the intent prompt and/or other user responses, and do not require a dedicated prompt/ question.

Sub-Flow Termination: Terminating the sub-flow, once the particular task has been fulfilled or handled according to the specific dialog sub-flow.

Jump To Option: Presenting a prompt to the user to select another task for fulfillment (e.g., "Can I help you with anything else today?"). in such case, the chatbot return to the root of intents to select 'jump to' points enabling the user to return to the 'root' on intents, to select and implement a different task.

Following is a discussion detailing exemplary results with respect to step 310, wherein chatbot generation module 210 may generate the following chatbot dialog flow with respect to a received IVR tree described in Figured 6A-6D:

ID Step: An ID step may be intended to capture an ID value from the user, which may be input in text or speech. The message to the user to input the ID may be phrased as:

"Type or say the store ID"

This step may be a preliminary step, or may be performed only after the user has made an intent selection, for greater efficiency.

Main intents: The chatbot dialog may then formulate a message which captures the main intents of the IVR tree. Such message may explicitly state all of the intents for user selection, or may ask a general question to elicit a response which will indicate user intent. For example, the chatbot dialog may present the four may intent selection nodes as a dialog message to the user, such as:

"Would you like to enter a sales report for today, select a previous date, use a different store ID, or exit?"

In cases where the intent node comprises a larger number of intents, the dialog question from the chatbot may be phrased as:

"What would you like to do?"
or
"How can I help you?"

Secondary intents: Secondary intents may be identified and treated in the same way as the main intent. The secondary intent nodes may be represented in the chatbot dialog with a single message which may expressly state all options, or otherwise be phrased as a general intent-eliciting phrase.

Entities: The names of intents and entities are directly derived from the respective IVR node message, the message that is sent to the user. Typically, the chatbot dialog will prompt the user to input entity values after recognizing the user intent. In some cases, the entity values may be inferred directly from the user response to the intent prompt and/or other user responses, and do not require a specific prompt/question.

The present invention may be a computer system, a computer-implemented method, and/or a computer program product. The computer program product may include a computer readable storage medium (or media) having computer readable program instructions thereon for causing a hardware processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A system comprising:
   at least one hardware processor; and
   a non-transitory computer-readable storage medium having stored thereon program instructions, the program instructions executable by the at least one hardware processor to:
      receive, as input, an interactive voice response (IVR) tree, wherein said IVR tree is configured to implement one or more tasks, and wherein each of said one or more tasks is associated with one or more IVR node paths, each comprising a plurality of IVR nodes arranged in a hierarchical relationship within said IVR tree,
      analyze said IVR tree to identify one or more intent IVR nodes, each associated with one of said tasks, wherein each of said intent IVR nodes comprises a selection dialog node representing two or more options for selection by a user of said IVR tree, and wherein each of said intent IVR nodes is not immediately succeeded by another selection IVR node within said hierarchical relationship,
      with respect to each of said intent IVR nodes, identify a plurality of corresponding entity IVR nodes included within the one or more IVR node paths associated with said intent IVR node,
      assemble one or more task-specific chatbot skills, each comprising (i) one of said intent IVR nodes, and (ii) at least some of said plurality of corresponding entity IVR nodes, wherein each of said task-specific chatbot skills is configured to perform one of said tasks by conducting a dialog with a user, and
      generate a chatbot comprising at least one of said task-specific chatbot skills.

2. The system of claim 1, wherein said program instructions are further executable to implement said chatbot by conducting said dialog with said user.

3. The system of claim 1, wherein each of said entity IVR nodes represents a variable value associated with said task associated with said intent IVR node.

4. The system of claim 1, wherein said chatbot is configured to select one of said task-specific chatbot skills for implementation, based, at least in part, on an intention statement input by said user, wherein said intention statement is input by said user in response to a prompt by said chatbot.

5. The system of claim 4, wherein said program instructions are further executable to implement one or more natural language processing (NLP) algorithms, to evaluate said intention statement, to (i) determine a semantic meaning of said intention message, and (ii) associate said intention message with one of said tasks.

6. The system of claim 1, wherein said dialog with said user comprises presenting one or more dialog prompts to said user, each configured to prompt said user to do at least one of: input a value, and make a selection.

7. A computer-implemented method comprising:
   receiving, as input, an interactive voice response (IVR) tree, wherein said IVR tree is configured to implement one or more tasks, and wherein each of said one or more tasks is associated with one or more IVR node paths, each comprising a plurality of IVR nodes arranged in a hierarchical relationship within said IVR tree;

analyzing said IVR tree to identify one or more intent IVR nodes, each associated with one of said tasks, wherein each of said intent IVR nodes comprises a selection dialog node representing two or more options for selection by a user of said IVR tree, and wherein each of said intent IVR nodes is not immediately succeeded by another IVR node within said hierarchical relationship;

with respect to each of said intent IVR nodes, identifying a plurality of corresponding entity IVR nodes included within the one or more IVR node paths associated with said intent IVR node;

assembling one or more task-specific chatbot skills, each comprising (i) one of said intent IVR nodes, and (ii) at least some of said plurality of corresponding entity IVR nodes, wherein each of said task-specific chatbot skills is configured to perform one of said tasks by conducting a dialog with a user; and generating a chatbot comprising at least one of said task-specific chatbot skills.

8. The computer-implemented method of claim 7, further comprising implementing said chatbot by conducting said dialog with said user.

9. The computer-implemented method of claim 7, wherein each of said entity IVR nodes represents a variable value associated with said task associated with said intent IVR node.

10. The computer-implemented method of claim 7, wherein said chatbot is configured to select one of said task-specific chatbot skills for implementation, based, at least in part, on an intention statement input by said user, wherein said intention statement is input by said user in response to a prompt by said chatbot.

11. The computer-implemented method of claim 10, further comprising implementing one or more natural language processing (NLP) algorithms, to evaluate said intention statement, to (i) determine a semantic meaning of said intention message, and (ii) associate said intention message with one of said tasks.

12. The computer-implemented method of claim 7, wherein said dialog with said user comprises presenting one or more dialog prompts to said user, each configured to prompt said user to do at least one of: input a value, and make a selection.

13. A computer program product comprising a non-transitory computer-readable storage medium having program instructions embodied therewith, the program instructions executable by at least one hardware processor to:

receive, as input, an interactive voice response (IVR) tree, wherein said IVR tree is configured to implement one or more tasks, and wherein each of said one or more tasks is associated with one or more IVR node paths, each comprising a plurality of IVR nodes arranged in a hierarchical relationship within said IVR tree;

analyze said IVR tree to identify one or more intent IVR nodes, each associated with one of said tasks, wherein each of said intent IVR nodes comprises a selection dialog node representing two or more options for selection by a user of said IVR tree, and wherein each of said intent IVR nodes is not immediately succeeded by another selection IVR node within said hierarchical relationship;

with respect to each of said intent IVR nodes, identify a plurality of corresponding entity IVR nodes included within the one or more IVR node paths associated with said intent IVR node;

assemble one or more task-specific chatbot skills, each comprising (i) one of said intent IVR nodes, and (ii) at least some of said plurality of corresponding entity IVR nodes, wherein each of said task-specific chatbot skills is configured to perform one of said tasks by conducting a dialog with a user; and generate a chatbot comprising at least one of said task-specific chatbot skills.

14. The system of claim 13, wherein said program instructions are further executable to implement said chatbot by conducting said dialog with said user.

15. The system of claim 13, wherein each of said entity IVR nodes represents a variable value associated with said task associated with said intent IVR node.

16. The system of claim 13, wherein said chatbot is configured to select one of said task-specific chatbot skills for implementation, based, at least in part, on an intention statement input by said user, wherein said intention statement is input by said user in response to a prompt by said chatbot.

17. The system of claim 16, wherein said program instructions are further executable to implement one or more natural language processing (NLP) algorithms, to evaluate said intention statement, to (i) determine a semantic meaning of said intention message, and (ii) associate said intention message with one of said tasks.

\* \* \* \* \*